US008244977B2

(12) United States Patent
Achanta et al.

(10) Patent No.: US 8,244,977 B2
(45) Date of Patent: Aug. 14, 2012

(54) DISPLAYING MEMORY STATISTICS FOR A KEYDRIVE

(75) Inventors: Phani Gopal V. Achanta, Austin, TX (US); Riaz Y. Hussain, Austin, TX (US); Scott Thomas Jones, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1895 days.

(21) Appl. No.: 11/126,115

(22) Filed: May 10, 2005

(65) Prior Publication Data
US 2006/0259689 A1 Nov. 16, 2006

(51) Int. Cl.
*G06F 13/14* (2006.01)
(52) U.S. Cl. ............... 711/115; 711/170; 711/E12.078
(58) Field of Classification Search .............. 711/101, 711/103, 156, 115, 170
See application file for complete search history.

(56) References Cited

U.S. PATENT DOCUMENTS

| | | | |
|---|---|---|---|
| 6,658,202 B1 | 12/2003 | Battaglia et al. | |
| 6,725,286 B2 | 4/2004 | Takahashi | |
| 6,816,071 B2 * | 11/2004 | Conti | 340/540 |
| 6,917,349 B2 * | 7/2005 | McGowan et al. | 345/30 |
| 7,124,238 B2 * | 10/2006 | Hong | 711/103 |
| 2003/0142551 A1 | 7/2003 | Green | |
| 2004/0054827 A1 | 3/2004 | Liu et al. | |
| 2005/0130471 A1 * | 6/2005 | Regen et al. | 439/131 |

OTHER PUBLICATIONS

Benini et al.; System-Level Power Optimization: Techniques and Tools; ACM Transactions on Design Automation of Electronic Systems; Apr. 2000; pp. 115-192; vol. 5, No. 2; US.
Koh; Memory Device Packaging—From Leadframe Packages to Wafer Level Packages; IEEE; AN-8109391; pp. 21-24; Kingston Technology Company; US.

* cited by examiner

*Primary Examiner* — Kenneth Lo
(74) *Attorney, Agent, or Firm* — DeLizio Gilliam, PLLC (57) ABSTRACT

Methods, systems, and products are provided that display memory statistics for a keydrive that do not require the keydrive to be plugged into another device. Displaying memory statistics according to embodiments of the present invention include receiving a command resulting in a change to the memory usage of the keydrive, calculating memory statistics describing the current state of memory usage of the keydrive, storing the memory statistics in memory on the keydrive, and displaying the memory statistics on a display on the keydrive. Calculating memory statistics describing the current state of memory usage of the keydrive may be carried out by calculating a total memory usage of the keydrive. Calculating memory statistics describing the current state of memory usage of the keydrive may also be carried out by calculating a percent of total memory used.

15 Claims, 7 Drawing Sheets

DISPLAYING MEMORY STATISTICS FOR A KEYDRIVE

BACKGROUND OF THE INVENTION

1. Field of the Invention

The field of the invention is data processing, or, more specifically, methods, systems, and products for displaying memory statistics for a keydrive.

2. Description Of Related Art

Keydrives are small removable data storage devices. Other names for keydrives include keychain drive, pen drive, pocket drive, memory stick, thumb drive, jump drive, USB flash drive, USB flash memory drive, USB key, USB memory key, USB stick, and others as will occur to those of skill in the art. Keydrives are typically small, lightweight devices that typically consist of a small printed circuit board encased in robust casing, making the drive sturdy enough to be carried around. Keydrives typically, but not always, use flash memory. Many keydrives also employ a USB connector. In the case of USB keydrives, typically only the USB connector protrudes from the protective casing and often the USB connector is covered by a removable plastic cap.

Conventional keydrives are only active when powered by a connection to a computer, and often require no external power source or battery power when not in use. Such keydrives are run from the limited power supply afforded by the connection such as the USB connection. To access the data stored in a keydrive, the keydrive must be connected to a computer, either by direct connection to a port or hub.

Keydrives are more resilient against scratches and dust and their durable design means they often survive casual insults such as being dropped, crushed or run through a washing machine. The resilient nature of keydrives makes them ideal for transporting personal data or work files from one location to another or for carrying around personal data that a user may want to access in a variety of places.

Keydrives are also a relatively dense form of storage. Keydrive capacity has historically ranged from a few megabytes in size up to a few gigabytes. Most operating systems can read and write to keydrives without any additional device drivers. Instead of exposing the complex technical detail of the underlying flash memory devices, the keydrives export a simple block-structured logical unit to the host operating system. This way the operating system can use whatever type of file system or block addressing scheme it wants.

Conventional keydrives do not provide a vehicle to display statistics describing their current memory usage. To determine the current available memory of a keydrive, the keydrive must be plugged into a device having system tools to determine the current memory usage of the keydrive. The device must also have a display to allow a user to view the memory statistics describing the current memory usage of the keydrive. There is therefore an ongoing need for a methods, systems, and products for displaying memory statistics for keydrives that do not require the keydrive to be plugged into another device.

SUMMARY OF THE INVENTION

Methods, systems, and products are provided that advantageously display memory statistics for a keydrive that do not require the keydrive to be plugged into another device. Displaying memory statistics according to embodiments of the present invention include receiving a command resulting in a change to the memory usage of the keydrive, calculating memory statistics describing the current state of memory usage of the keydrive, storing the memory statistics in memory on the keydrive, and displaying the memory statistics on a display on the keydrive. Calculating memory statistics describing the current state of memory usage of the keydrive may be carried out by calculating a total memory usage of the keydrive. Calculating memory statistics describing the current state of memory usage of the keydrive may also be carried out by calculating a percent of total memory used. Storing the memory statistics in memory on the keydrive may include storing the memory statistics in a dedicated register on the keydrive.

Displaying the memory statistics on a display on the keydrive may be carried out by receiving a user instruction to display the memory statistics and reading from memory on the keydrive the memory statistics. The display on the keydrive may be an LCD. The display on the keydrive may also be an LED.

The command resulting in a change to the memory usage of the keydrive may include a write command and calculating memory statistics describing the current state of memory usage of the keydrive may be carried out by incrementing a memory usage counter. The command resulting in a change to the memory usage of the keydrive may include a delete command and calculating memory statistics describing the current state of memory usage of the keydrive may be carried out by decrementing a memory usage counter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for displaying memory statistics for a keydrive. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Displaying Memory Statistics For a Keydrive

Figure 1:
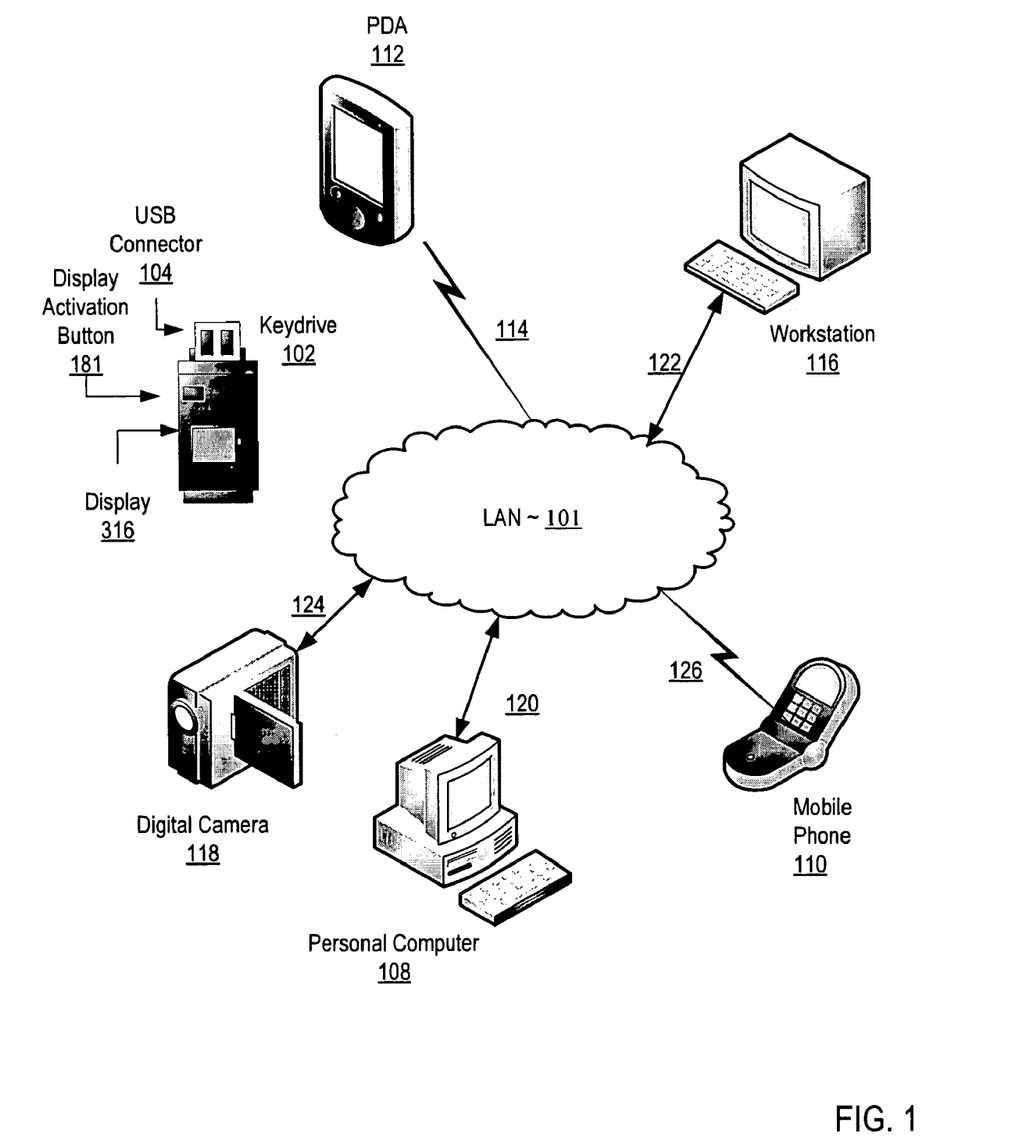
FIG. 1 sets forth a network diagram illustrating an exemplary system of devices that accept keydrives according to embodiments of the present invention.

Exemplary methods, systems, and products for displaying memory statistics for a keydrive according to embodiments of the present invention are described with reference to the accompanying drawings, beginning with FIG. 1. FIG. 1 sets forth a network diagram illustrating an exemplary system of devices that can accept keydrives according to embodiments of the present invention. In the example of FIG. 1, a PDA (112), a workstation (116), a network-enabled mobile phone (110), a personal computer (108), and a digital camera (118) are couple for data communications to a local area network ('LAN') (101). The PDA (112) is connected to the LAN (101) through a wireless connection (114) and the network-enabled mobile phone (110) is also connected to the LAN (101) through a wireless connection (126). The workstation (116) is connected to the LAN (101) through a wireline connection (122). The personal computer (108) is connected to the LAN (101) through a wireline connection (120). The digital camera (118) is also connected to the LAN (101) through a wireline connection (124).

Each of the devices (112, 116, 110, 108, and 118) of FIG. 1 is capable of a accepting a keydrive (102) capable of displaying memory statistics according to embodiments of the present invention. The exemplary keydrive (102) of FIG. 1 includes a USB connector (104) that connects to a USB port in each device (112, 116, 110, 108, and 118) of FIG. 1. The keydrive (102) also includes a display (316) useful in displaying memory statistics for a keydrive according to embodiments of the present invention. The exemplary keydrive (102) of FIG. 1 operates generally to display memory statistics for a keydrive according to embodiments of the present invention by receiving a command from one of the devices (112, 116, 110, 108, and 118) of FIG. 1 that results in a change to the memory usage of the keydrive (102). Examples of commands that result in change to the memory usage of the keydrive (102) include write commands writing to the memory of the keydrive and delete commands that free memory on the keydrive. The keydrive of FIG. 1 is also capable of calculating memory statistics describing the current state of memory usage of the keydrive and storing the memory statistics in memory on the keydrive (102).

The keydrive (102) of FIG. 1 does not have to plugged into one of the devices of FIG. 1 to display the memory statistics. The keydrive (102) of FIG. 1 includes a display activation button (181) that receives a user instruction to display the memory statistics. Upon receiving an instruction to display the memory statistics, the keydrive of FIG. 1 is capable of reading from memory on the keydrive the memory statistics and displaying the memory statistics on the display on the keydrive (102).

In alternative embodiments, one or more of the devices (112, 116, 110, 108, and 118) of FIG. 1 have installed upon them a driver capable of receiving a command that results in a change to the memory usage of the keydrive (102), calculating memory statistics describing the current state of memory usage of the keydrive, and storing the memory statistics in memory on the keydrive (102). In such embodiments, the keydrive may display the memory statistics but a driver installed on one of the devices calculates and stores the memory statistics. Such embodiments, advantageously allow for keydrives with little or no processing capability.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Displaying memory statistics for a keydrive in accordance with the present invention is generally implemented with keydrives employing automated computing machinery. For further explanation, therefore, FIG. 2 sets forth a block diagram of a keydrive (102) capable of displaying memory statistics according to embodiments of the present invention. The keydrive (102)) of FIG. 2 includes at least one computer processor (156) or 'CPU' as well as random access memory (168) ("RAM") which is connected through a keydrive bus (160) to the processor (156) and to other components of the keydrive. The processor of a typical keydrive is often a RSIC ('Reduced Instruction Set Computer') microprocessor or other lightweight processor.

Figure 2:
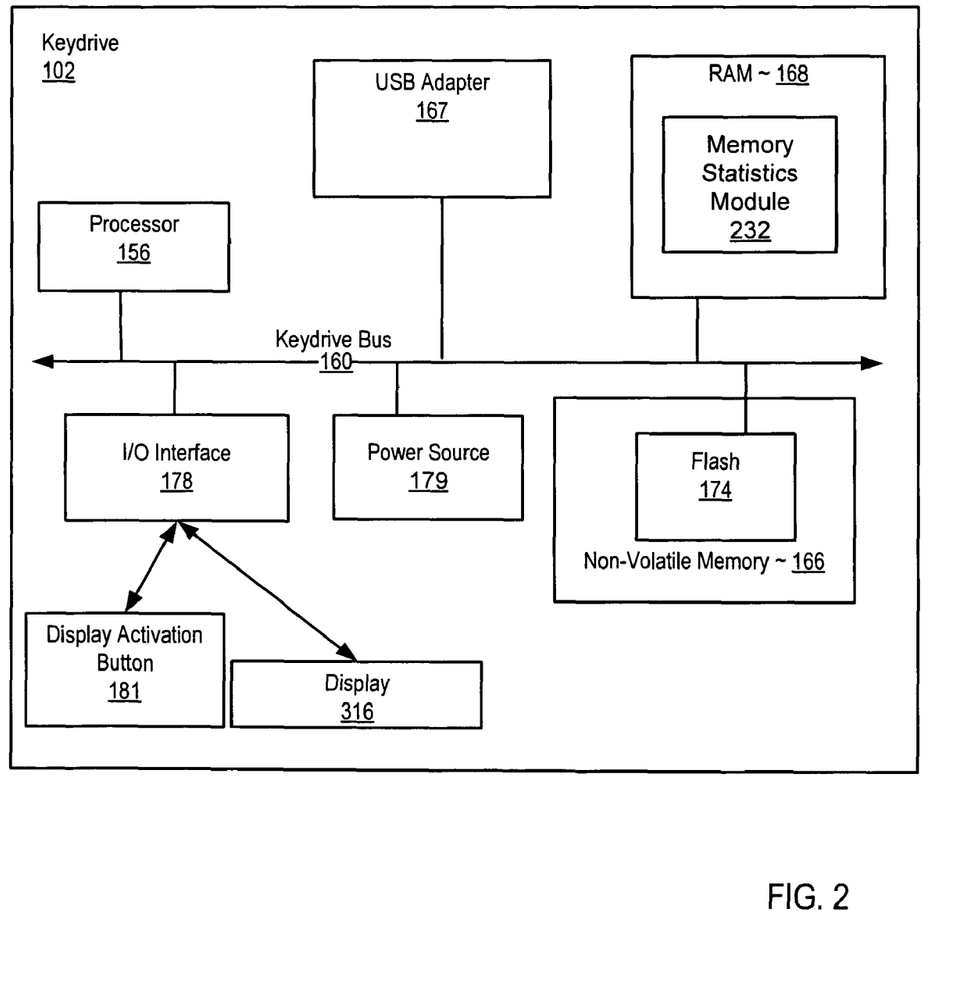
FIG. 2 sets forth a block diagram of automated computing machinery comprising a keydrive useful in displaying memory statistics according to embodiments of the present invention.

Stored in RAM (168) is a memory statistics module (232). The exemplary memory statistics module (232) includes computer program instructions capable of receiving a command resulting in a change to the memory usage of the keydrive, calculating memory statistics describing the current state of memory usage of the keydrive, and storing the memory statistics in memory on the keydrive. The exemplary memory statistics module is also capable of receiving a user instruction to display the memory statistics, reading from memory on the keydrive the memory statistics, and displaying the memory statistics on the display (316) on the keydrive.

Keydrive (102) of FIG. 2 includes non-volatile computer memory (166) coupled through the keydrive bus (160) to the processor (156) and to other components of the computer (152). In the example of FIG. 2, the non-volatile computer memory (166) is implemented as electrically erasable programmable read-only memory space (so-called 'EEPROM' or 'Flash' memory) (174). While the keydrive of FIG. 2 is depicted with flash memory (174), this is for explanation and not for limitation. In fact, keydrives may be implemented with hard disk drive (170), optical disk drive (172), or as any other kind of computer memory as will occur to those of skill in the art.

The exemplary keydrive (152) of FIG. 2 includes a USB communications adapter (167) for implementing data communications with other computers. Such data communications may be carried out an external USB bus. Although the keydrive (102) of FIG. 2 is implemented with a USB communications adapter, this is for explanation and not for limitation. In fact, keydrives according to embodiments of the present invention may employ any type of communications adapter and interface for coupling the keydrive to a device as will occur to those of skill in the art.

The example keydrive (102) of FIG. 2 includes one or more input/output interface adapters (178). The exemplary input/output interface adapter of FIG. 2 implements user-oriented input/output through, for example, software drivers and computer hardware for controlling output to displays (316), as well as user input from users through a display activation button (181).

The exemplary keydrive (102) computer of FIG. 2 includes a display activation button (181). Upon a user engaging the display activation button (102), the memory statistics module (232) of the keydrive (102) receives an event representing a user instruction to display memory statistics describing the current state of memory usage of the keydrive. Upon receiving the user instruction to display memory statistics, the memory statistics module reads from memory on the keydrive the memory statistics and displays the memory statistics on the display.

The example keydrive (102) of FIG. 2 also includes a display (316). The display of FIG. 2 may be implemented as a liquid crystal display ('LCD') or a light emitting diode ('LED') or any other display capable of displaying memory statistics that will occur to those of skill in the art. LCD displays utilize two sheets of polarizing material with a liquid crystal solution between them. An electric current passed through the liquid causes the crystals to align so that light cannot pass through them. Each crystal, therefore, is like a shutter, either allowing light to pass through or blocking the light. The contrast between the opaque and transparent areas forms visible characters.

A light-emitting diode (LED) is a semiconductor device that emits incoherent monochromatic light when electrically biased in the forward direction. This effect is a form of electroluminescence. The color depends on the semiconducting material used, and can be near-ultraviolet, visible or infrared. An LED consists of a chip of semiconducting material impregnated, or doped, with impurities to create a structure called a p-n junction. Charge-carriers (electrons and holes) are created by an electric current passing through the junction. When an electron meets a hole, it falls into a lower energy level, and releases energy in the form of a photon as it does so. When the voltage across the p-n junction is in the correct direction, current flows and the device is said to be forward-biased. The voltage across the LED in this case is fixed for a given LED and is proportional to the energy of the emitted photons. If the voltage is of the wrong polarity, the device is said to be reverse biased, very little or no current flows, and no light is emitted. Some LED units contain two diodes allowing two-color operation or a range of apparent colors to be created by altering the percentage of time the voltage is in each polarity. Other LED units contain two or more diodes of different colors arranged in either a common anode or common cathode configuration. These can be driven to different colors without reversing the polarity.

There are two types of LED display panels: discrete LEDs and surface mounted device panels ('SMD'). Discrete LEDs use a cluster of red, green, and blue diodes driven together to form a full-color pixel, usually square in shape. These pixels are spaced evenly apart and are measured from center to center for absolute pixel resolution. An SMD panel consists of red, green, and blue diodes mounted on a chipset. The chipset is then mounted on the driver PC board. The individual diodes of the SMD are smaller than a pin and are set very close together. The difference between a discrete LED and an SMD is that minimum viewing distance of the SMD is often reduced from the discrete LED screen with the same resolution.

There is no requirement that the display of keydrives according to embodiments of the present invention be sophisticated. In fact, a display capable of displaying memory statistics may be as simple as a single LED whose activation represents a crude representation of memory statistics such as indicating that the memory usage of the keydrive is beyond a predetermined threshold. Displays capable of displaying memory statistics may range from one or a series of LEDs to more sophisticated displays as will occur to those of skill in the art. All displays capable of displaying memory statistics, no matter how simple or sophisticated, are well within the scope of the present invention.

To power the display (102) when the keydrive (102) is not coupled to a device, the keydrive (102) of FIG. 2 includes a power source (179). The power source may be a capacitor which is charged each time the device is connected to another digital device, a small power cell, or any other power source that will occur to those of skill in the art.

The keydrive (102) of FIG. 2 is illustrated with a processor. This is for explanation and not for limitation. In fact, in alternative embodiments, the key drive may employ logic circuitry to retrieve from memory and display the memory statistics. Such embodiments may rely on a driver installed on another device to calculate the memory statistics describing the current state of memory usage of the keydrive and store the memory statistics in memory on the keydrive. Such embodiments, advantageously allow for keydrives with little or no processing capability.

Figure 3:
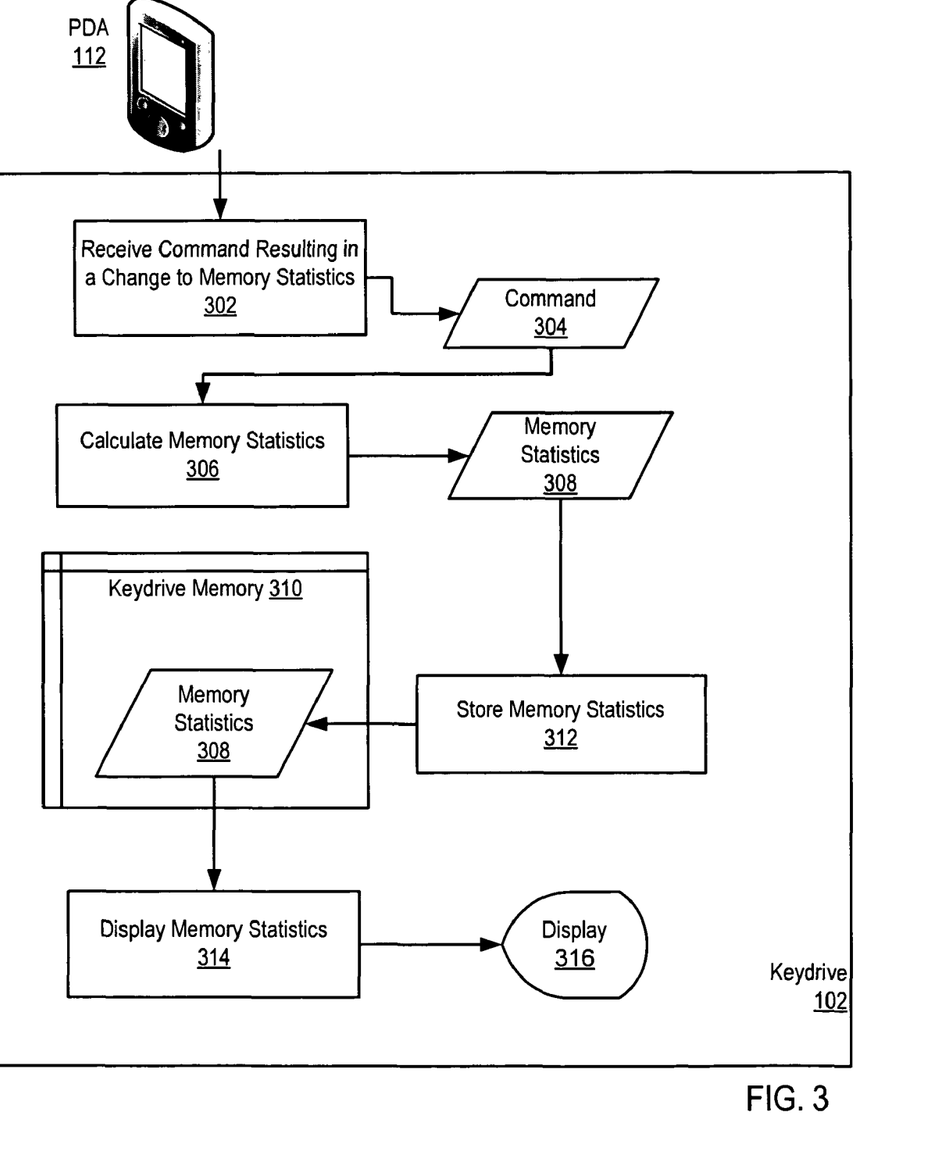
FIG. 3 sets forth a flow chart illustrating an exemplary method for displaying memory statistics for a keydrive.

For further explanation, FIG. 3 sets forth a flow chart illustrating an exemplary method for displaying memory statistics for a keydrive that includes receiving (302) a command (304) resulting in a change to the memory usage of the keydrive (102). Examples of commands (304) resulting in a change to the memory usage of the keydrive (102) include write commands that increase the current memory usage of the keydrive and delete commands that reduce the current memory usage of the keydrive.

The method of FIG. 3 includes calculating (306) memory statistics (308) describing the current state of memory usage of the keydrive (102). Calculating (308) memory statistics (308) describing the current state of memory usage of the keydrive (102) may be carried out by calculating a total memory usage of the keydrive (102). That is, the memory statistics may be simply a single value representing the total memory currently used in the keydrive.

Calculating (308) memory statistics (308) describing the current state of memory usage of the keydrive (102) may also be carried out by calculating a percent of total memory used. Calculating a percent of total memory used is typically carried out by calculating a current total memory usage of the keydrive (102) and dividing the current total memory usage of keydrive by the total memory capacity of the keydrive.

The method of FIG. 3 includes storing (312) the memory statistics (308) in memory (310) on the keydrive (102). Storing (312) the memory statistics (308) in memory (310) on the keydrive (102) may be carried out by storing the memory statistics in a dedicated register on the keydrive (102), storing the memory statistics in the memory not dedicated for such memory statistics, or in other ways as will occur to those of skill in the art.

The method of FIG. 3 also includes displaying (314) the memory statistics (308) on a display (316) on the keydrive (102). As discussed above, the display (316) of FIG. 3 may be an LCD, an LED or any other display capable of displaying memory statistics as will occur to those of skill in the art.

Figure 4:
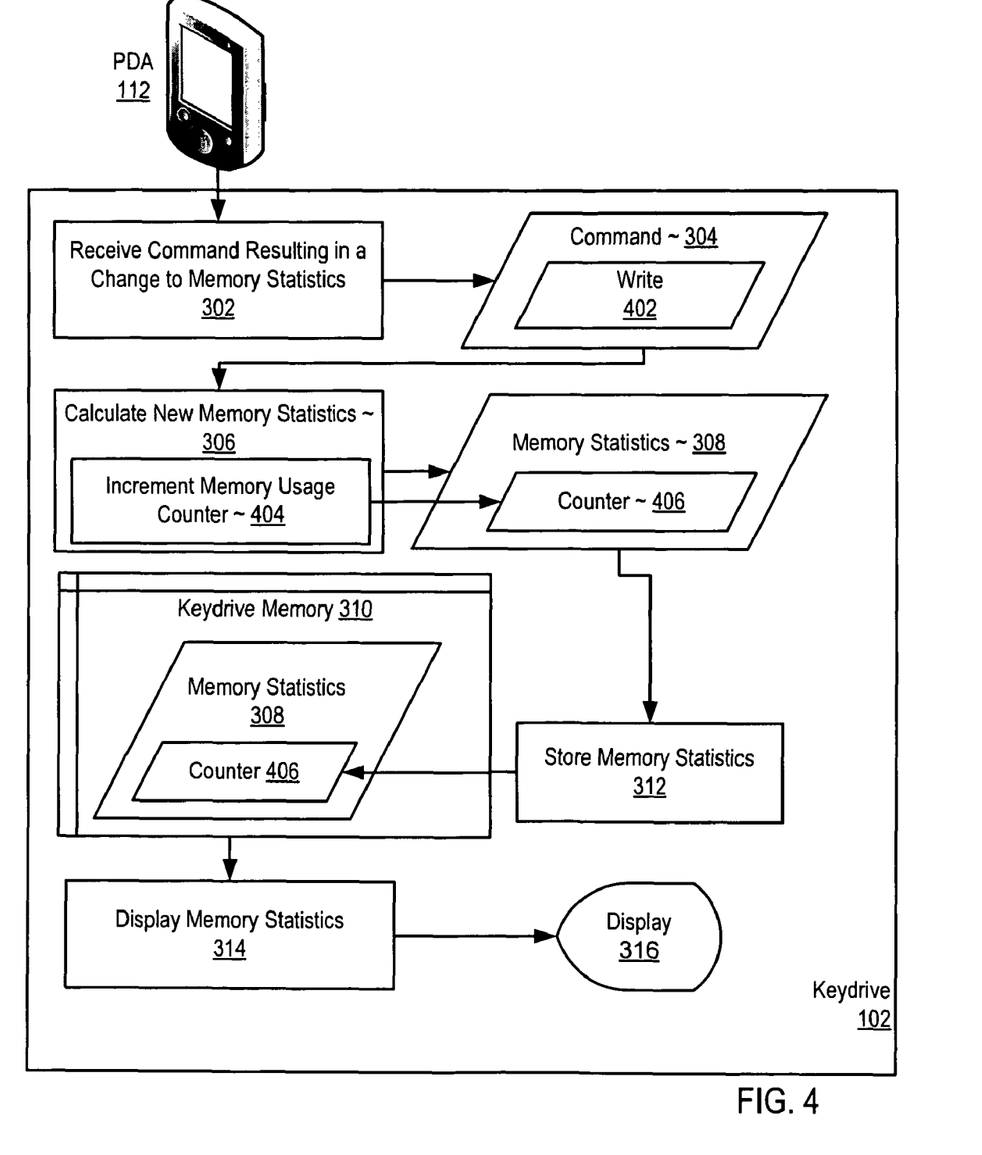
FIG. 4 sets forth a flow chart illustrating an exemplary method for displaying memory statistics for a keydrive wherein the command resulting in a change to the memory usage of the keydrive includes a write command.

As discussed above, commands resulting in a change to the memory usage of the keydrive include write commands and delete commands. For further explanation, FIG. 4 sets forth a flow chart illustrating an exemplary method for displaying memory statistics for a keydrive wherein the command resulting in a change to the memory usage of the keydrive (102) includes a write (402) command. In the example of FIG. 4, calculating (306) memory statistics (308) describing the current state of memory usage of the keydrive (102) is carried out by incrementing (404) a memory usage counter (406). In such embodiments, a memory usage counter (406) is a data structure containing the current total memory usage of the keydrive. Keydrives operating according to the method of FIG. 4 upon receiving a write command increment the counter by a value equal to the amount of memory written by carrying out the command. The method of FIG. 4 advantageously provides an efficient method of providing a running count of current memory used on the keydrive.

Figure 5:
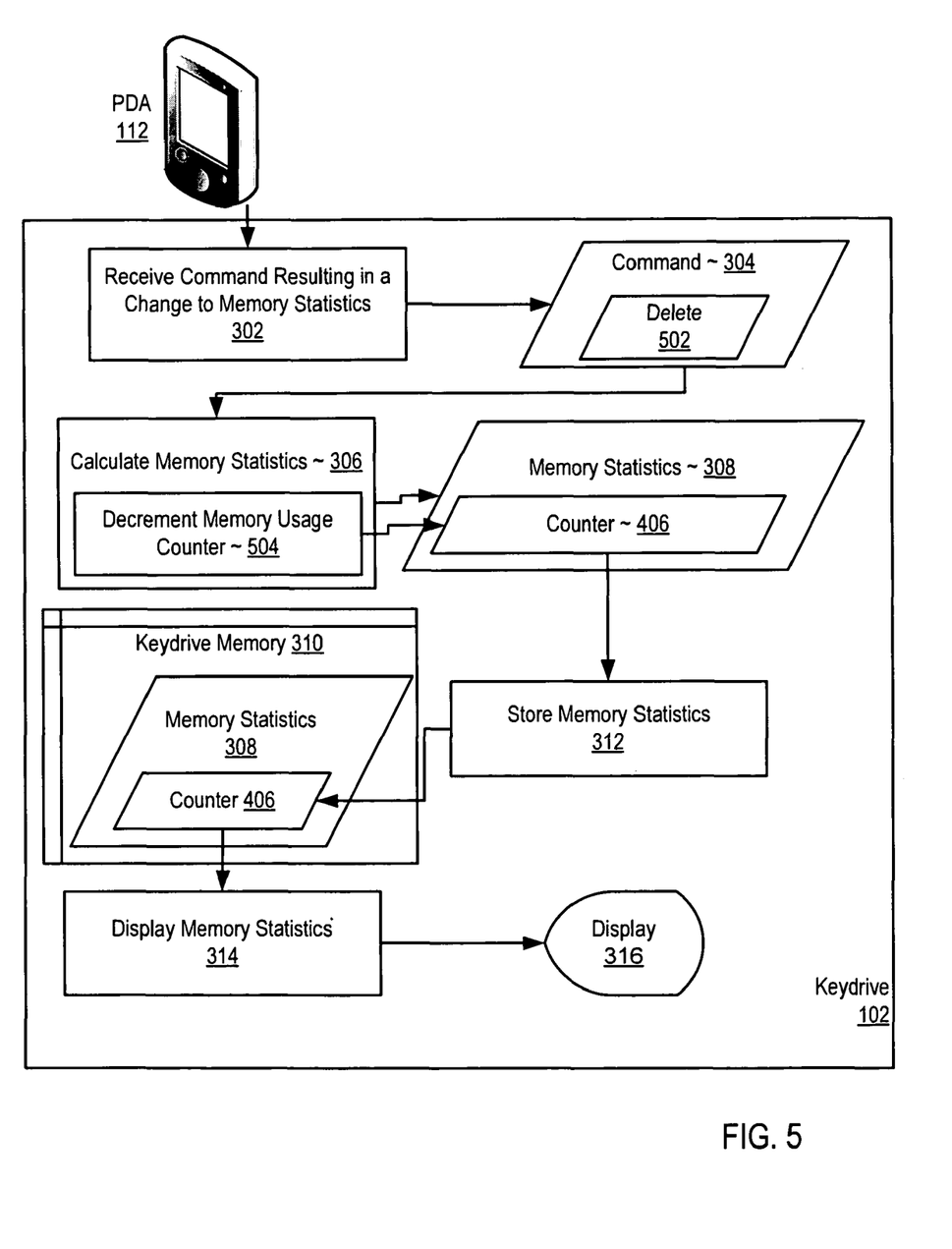
FIG. 5 sets forth a flow chart illustrating an exemplary method for displaying memory statistics for a keydrive wherein the command resulting in a change to the memory usage of the keydrive includes a delete command.

For further explanation, FIG. 5 sets forth a flow chart illustrating an exemplary method for displaying memory statistics for a keydrive wherein the command resulting in a change to the memory usage of the keydrive (102) includes a delete command. In the example of FIG. 5, the command (304) resulting in a change to the memory usage of the keydrive (102) includes a delete (502) command. In the example of FIG. 5, calculating (306) memory statistics (308) describing the current state of memory usage of the keydrive (102) is carried out by decrementing (504) a memory usage counter (408). In such embodiments, a memory usage counter (406) is a data structure containing the current total memory usage of the keydrive. Keydrives operating according to the method of FIG. 5 upon receiving a delete command decrement the counter by a value equal to the amount of memory erased by carrying out the command. The method of FIG. 5 advantageously provides an efficient method of providing a running count of current memory used on the keydrive.

Figure 6:
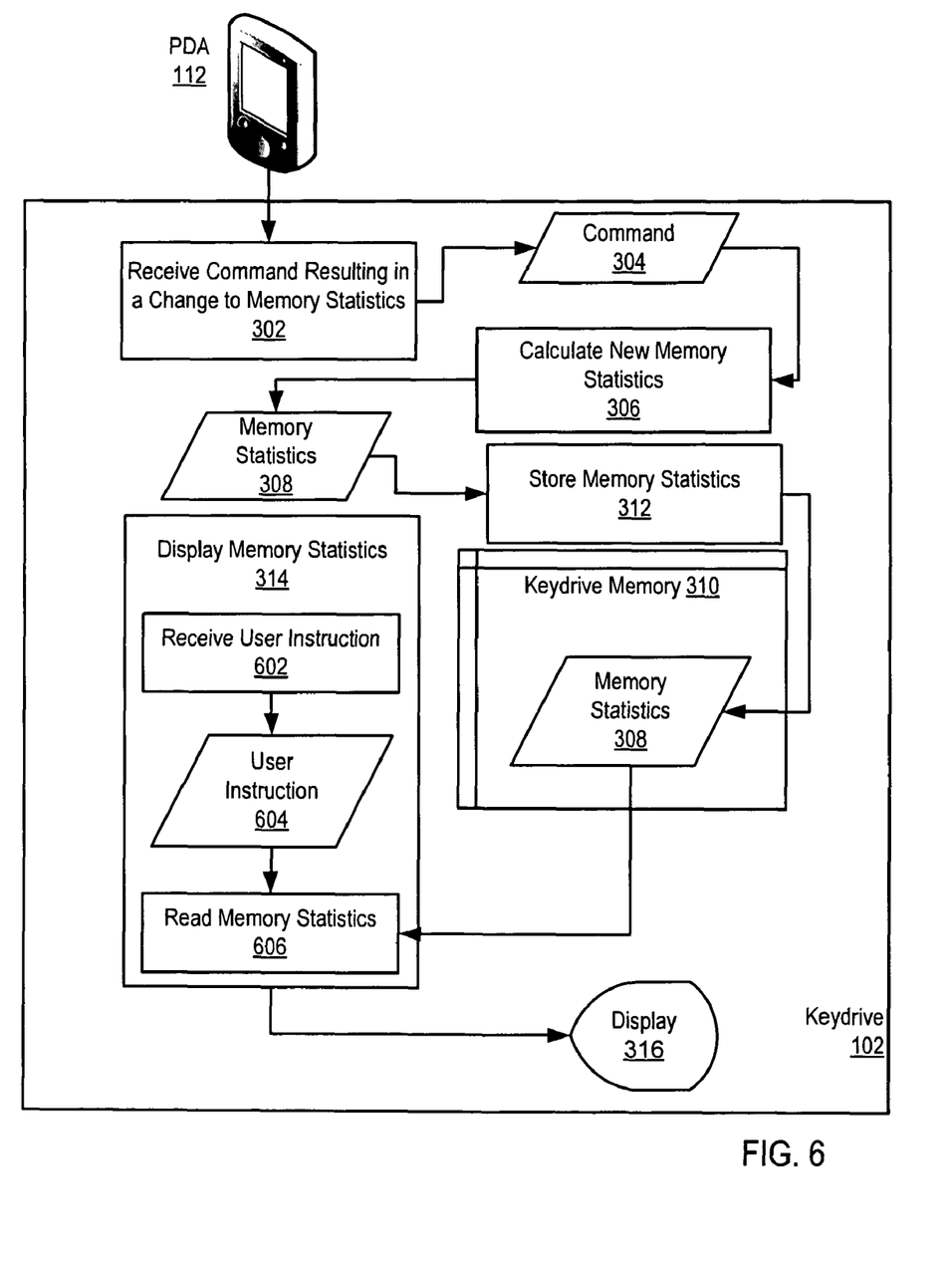
FIG. 6 sets forth a flow chart illustrating an exemplary method of displaying the memory statistics for a keydrive on a display on the keydrive.

As discussed above, some keydrives according to embodiments of the present invention include a user input devices such as a display activation button instructing a memory statistics module in the keydrive to display the memory statistics for the keydrive. For further explanation, FIG. 6 sets forth a flow chart illustrating an exemplary method of displaying memory statistics for a keydrive according to such embodiments. In the example of FIG. 6, displaying (314) the memory statistics (308) on a display (316) on the keydrive (102) is carried out by receiving (602) a user instruction (604) to display the memory statistics (308) and reading (606) from memory (310) on the keydrive (102) the memory statistics (308) for display on the keydrive. Receiving (602) a user instruction (604) to display the memory statistics (308) is typically carried out by sensing a user's engaging a user input device such as a display activation button on the keydrive. Upon receiving through the button a user instruction (604) to display the memory statistics (308), a memory statistics module running on the keydrive reads (606) from memory (310) on the keydrive (102) the memory statistics (308) and displays the memory statistics on a display on the keydrive.

Figure 7:
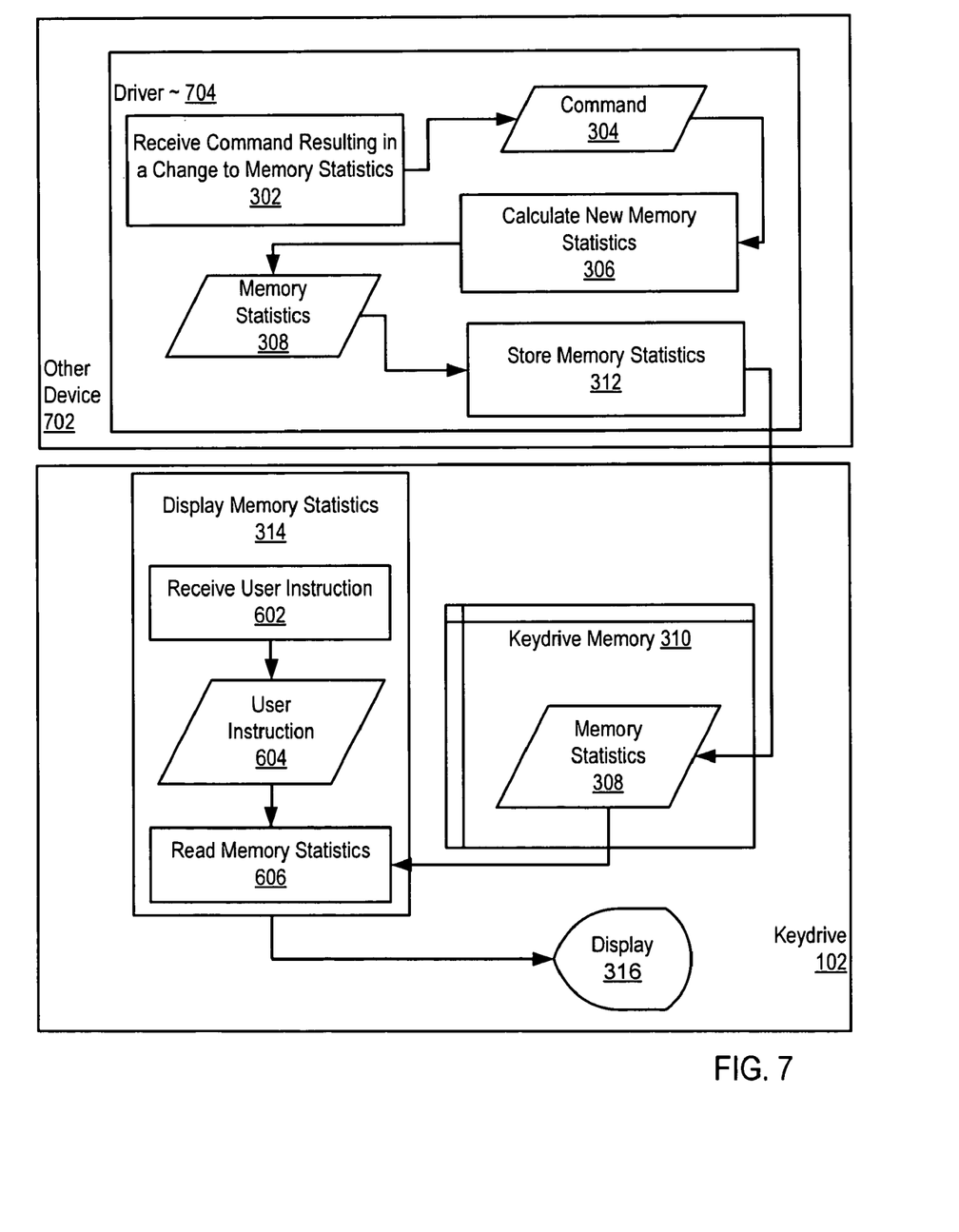
FIG. 7 sets forth a flow chart illustrating another exemplary method for displaying memory statistics for a keydrive.

The description of exemplary embodiments of displaying memory statistics for a keydrive with reference to FIGS. 3-6 have described keydrives capable of receiving (302) a command (304) resulting in a change to the memory usage of the keydrive (102), and calculating (306) memory statistics (308) describing the current state of memory usage of the keydrive (102). This is for explanation and not for limitation. In fact, the steps of receiving (302) a command (304) resulting in a change to the memory usage of the keydrive (102), and calculating (306) memory statistics (308) describing the current state of memory usage of the keydrive (102) may be carried out by a more robust computer to which the keydrive is connected. For further explanation, FIG. 7 sets forth a flow chart illustrating another exemplary method for displaying memory statistics for a keydrive. In the example of FIG. 7, the steps of receiving (302) a command (304) resulting in a change to the memory usage of the keydrive (102), calculating (306) memory statistics (308) describing the current state of memory usage of the keydrive (102), and storing (312) the memory statistics in memory on the keydrive are carried out by another device (702) to which the keydrive is coupled for data communications. Receiving (302) a command (304) resulting in a change to the memory usage of the keydrive (102) and calculating (306) memory statistics (308) describing the current state of memory usage of the keydrive (102) may be implemented through the use of a driver (704) installed on the device (702) to which the keydrive is coupled for data communications.

In the example of FIG. 7, displaying (314) the memory statistics (308) on a display (316) on the keydrive (102) is carried out by receiving (602) a user instruction (604) to display the memory statistics (308) and reading (606) from memory (310) on the keydrive (102) the memory statistics (308) for display on the keydrive. In the example of FIG. 7 the user instruction to display the memory statistics may be received at any time and the memory statistics stored in the keydrive may be displayed to the user without requiring the keydrive to be coupled to another device.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A keydrive, the keydrive comprising:
   logic circuitry;
   a power source;
   a display; and
   a computer memory coupled for data transfer to the logic circuitry, the computer memory having disposed within it a memory statistics module, the memory statistics module comprising computer program instructions capable of:
   storing memory statistics received from another device in memory on the keydrive, and
   displaying the memory statistics on a display on the keydrive;
   wherein the another device further comprises a processor and computer memory operatively coupled to the processor, the device's computer memory having stored within it computer program instructions capable of:
   receiving a command resulting in a change to the memory usage of the keydrive, calculating the memory statistics describing the current state of memory usage of the keydrive, and storing the memory statistics in memory on the keydrive.

2. The keydrive of claim 1 wherein the another device further comprises a memory usage counter and wherein the device's computer memory has stored within it computer program instructions capable of incrementing the memory usage counter.

3. The keydrive of claim 1 wherein the another device further comprises a memory usage counter and wherein the device's computer memory has stored within it computer program instructions capable of decrementing the memory usage counter.

4. The keydrive of claim 1 wherein calculating memory statistics describing the current state of memory usage of the keydrive further comprises calculating a total memory usage of the keydrive.

5. The keydrive of claim 1 wherein calculating memory statistics describing the current state of memory usage of the keydrive further comprises calculating a percent of total memory used.

6. The keydrive of claim 1 further comprising a dedicated register to store memory statistics.

7. The keydrive of claim 1 further comprising a user input device; and wherein the memory statistics module further comprises computer program instructions capable of:

receiving a user instruction to display the memory statistics; and reading from memory on the keydrive the memory statistics.

8. The keydrive of claim 1 wherein the display further comprises an LCD.

9. The keydrive of claim 1 wherein the display further comprises an LED.

10. A computer program product for displaying memory statistics for a keydrive, the computer program product comprising computer program instructions disposed upon a computer readable recording medium, the computer program instructions when executed performing:

receiving, by a device, a command resulting in a change to the memory usage of the keydrive;

calculating, by the device, memory statistics describing the current state of memory usage of the keydrive;

storing, by the device, the memory statistics in memory on the keydrive; and displaying, by the keydrive, the memory statistics on a display on the keydrive.

11. The computer program product of claim 10 wherein calculating memory statistics describing the current state of memory usage of the keydrive further comprises incrementing a memory usage counter.

12. The computer program product of claim 10 wherein calculating memory statistics describing the current state of memory usage of the keydrive further comprises decrementing a memory usage counter.

13. The computer program product of claim 10 wherein calculating memory statistics describing the current state of memory usage of the keydrive further comprises calculating a total memory usage of the keydrive.

14. The computer program product of claim 10 wherein calculating memory statistics describing the current state of memory usage of the keydrive further comprises calculating a percent of total memory used.

15. The computer program product of claim 10 wherein displaying the memory statistics on a display on the keydrive further comprises:

receiving a user instruction to display the memory statistics; and reading from memory on the keydrive the memory statistics.

* * * * *